# 3,784,583
LATENT ORGANIC PHOSPHONIUM SALT CATALYSTS FOR CURING GLYCIDYL ETHER EPOXY RESINS

James D. B. Smith, Turtle Creek, Pa., assignor to Westinghouse Electric Corporation, Pittsburgh, Pa.
Filed Oct. 14, 1971, Ser. No. 189,323
Int. Cl. C08g 45/06
U.S. Cl. 260—830 TW   4 Claims

ABSTRACT OF THE DISCLOSURE

A resinous composition, suitable for insulating electrical members, is made from a mixture containing about 90 to 120 parts of a glycidyl ether epoxy resin, about 130 to 165 parts of an acid anhydride and about 0.02 to 0.70 part of a quaternary organic phosphonium salt acting as a latent catalyst.

BACKGROUND OF THE INVENTION

To improve high temperature stability over amine cured epoxy resin systems and to give better physical and electrical properties, it has been the general practice in the epoxy technological field to use anhydride curing agents with glycidyl ether epoxy resins. Most anhydride formulations require elevated-temperature cures and for most commercial applications, it is necessary to add some form of catalyst to speed the rate of cure. Consequently, a considerable amount of effort has been devoted in recent years to develop a perfect latent catalyst for curing glycidyl ether epoxy resins.

The properties desired of such a latent catalyst are the following:

(a) It should give rapid cure of epoxy resins at moderately elevated temperatures (i.e., 135°–180° C.).

(b) It should be completely miscible with the resins at all temperatures.

(c) The storage life of the catalyzed resin should be indefinite. In practice, the viscosity of the resin should not change appreciably at room temperature after periods of one to several months.

(d) It should not adversely affect the properties of the cured resin. In particular, the electrical and mechanical properties of the resin should not be affected by the catalyst.

Several latent catalysts have appeared on the commercial scene in recent years. Included are quaternary ammonium halides such as benzyltrimethyl-ammonium chloride, stannous octoate, "extra-coordinate" siliconate salts, triethanolamine borate, triethanolamine, titanate and various other metal chelates. However, all of these materials have been rejected for one reason or another and the quest for improved, perfect latent catalysts for anhydride cured glycidyl ether epoxy resins continues.

SUMMARY OF THE INVENTION

It has been discovered that quaternary organic phosphonium salts will behave as latent catalysts for glycidyl ether epoxy resins, when used in certain weight proportions with an acid anhydride. The effective weight ratio glycidyl ether bisphenol A or novolac resin:acid anhydride:quaternary organic phosphonium salt is 90 to 120:130 to 165:0.02 to 0.70.

Very good storage properties at ambient temperatures have been found, consequently, long life one-component resin formulations employing these accelerators are possible. Electrical measurements on the cured system show relatively low dielectric constants and power factor values even at temperatures up to 150° C.

BRIEF DESCRIPTION OF THE DRAWINGS

For a better understanding of the invention, reference may be made to the preferred embodiments, exemplary of the invention, shown in the accompanying drawings, in which:

FIG. 1 is a vertical sectional view through a transformer; and

FIG. 2 is a graph of pot life of the resin formulations of the examples vs. parts phosphonium salt per 100 parts glycidyl ether epoxy resin.

DESCRIPTION OF THE PREFERRED EMBODIMENTS

It has been found that quarternary phosphonium salts are particularly effective latent catalysts for the anhydride cure of glycidyl ether bisphenol A and novolac epoxy casting compositions used in encapsulating electrical devices. At concentrations of about 0.02 to 0.70 part quaternary phosphonium salt per 100 parts bisphenol A or novolac epoxy resin, rapid gel times in the temperature range of 135° to 170° C. are possible. The term "latent catalyst" is taken to means the ability of these quaternary phosphonium salts to speed up curing rates at elevated temperatures (e.g. over 100° C.) while exhibiting little or no cure at room temperature, thus giving good storage properties.

The quaternary phosphonium compounds have the general structural formula:

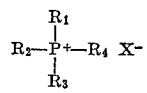

where $R_1$, $R_2$, $R_3$ and $R_4$ are aryl radicals or alkyl radicals having 1 to 21 carbon atoms with preferred alkyl radicals having 4 to 12 carbons. X, bonded to the phosphorus, is propionate, acetate, butyrate, isobutyrate or dimethylphosphate radical.

The reaction mechanism which makes these quaternary phosphonium compounds such potent catalysts for anhydride cured bisphenol A and novolac epoxy resins is not clear at this time. It seems that the mechanism proceeds through the formation of a phosphonium salt-epoxy or phosphonium salt-anhydride adduct followed by proton transfer from the adduct to other epoxy or anhydride molecules.

The quaternary phosphonium salts must be mixed in critical proportions with the epoxy-anhydride system. The useful weight percent range of ingredients, to provide a good compromise of cure time, storage life and electrical and mechanical properties, is a glycidyl ether of bisphenol A or novolac epoxy resin:acid anhydride: quaternary organic phosphonium salt ratio of 90 to 120:130 to 165:0.02 to 0.70, with a preferred range of about 90 to 120:130 to 165:0.03 to 0.10, respectively. Examples of suitable quaternary phosphonium salts which can be used alone or in admixtures would include, for example, tetrabutylphosphonium acetate, methyltrioctylphosphonium dimethylphosphate, methyltriphenylphosphonium dimethylphosphate, and methyltributylposphonium dimethylphosphate.

The glycidyl polyether of a dihydric phenol which may be employed in the invention is obtainable by reacting epichlorhydrin with a dihydric phenol in an alkaline medium at about 50° C. using 1 to 2 or more moles of epichlorhydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the formula:

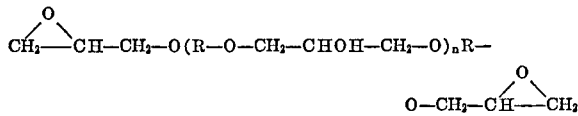

where $n$ is an integer of the series 0, 1, 2, 3 . . . , and R represents the divalent hydrocarbon radical of the dihydric phenol. Typically R is:

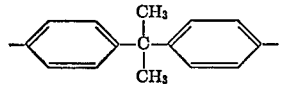

The glycidyl polyethers of a dihydric phenol used in the invention have a 1,2 epoxy equivalency between 1.0 and 2.0. By the epoxy equivalency, reference is made to the average number of 1,2 epoxy groups,

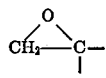

contained in the average molecule of the glycidyl ether. These glycidyl polyethers are commonly called bisphenol A type epoxy resins. Bisphenol A (p,p-dihydroxy-diphenyldimethyl methane) is the dihydric phenol used in these epoxides.

Typical epoxy resins of bisphenol A are readily available in commercial quantities and reference may be made to the Handbook of Epoxy Resins by Lee and Neville for a complete description of their synthesis or to U.S. patents: 2,324,483; 2,444,333; 2,500,600; 2,511,913; 2,558,949; 2,582,985; 2,615,007; and 2,633,458.

Other glycidyl ether resins that are useful in this invention and which can be used in place of bisphenol A type epoxy resins include polyglycidyl ethers of a novolac. The polyglycidyl ethers of a novolac suitable for use in accordance with this invention are prepared by reacting an epihalohydrin with phenol formaldehyde condensates. While the bisphenol A-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of novolac.

The production of the reaction is generally a massive oxidation resistant aromatic compound, one example of which is represented by the formula:

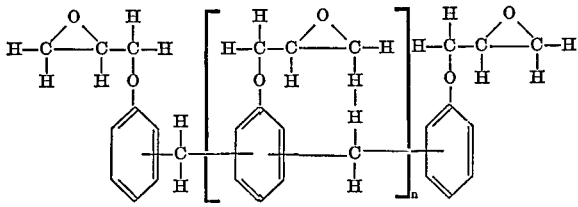

wherein $n$ is an integer of the series 0, 1, 2, 3 etc.

Although novolac resins from formaldehyde are generally preferred for use in this invention, novolac resins from any other aldehyde such as, for example, acetaldehyde, chloraldehyde, butyraldehyde, fufuraldehyde, can also be used. Although the above formula shows a completely epoxidized novolac, other novolacs which are only partially epoxidized can be useful in this invention.

The glycidyl ether epoxy resins may also be characterized by reference to their epoxy equivalent weight, which is the mean molecular weight of the particular resin divided by the mean number of epoxy units per molecule. In the present invention, the suitable epoxy resins are characterized by an epoxy equivalent weight of from about 300 to about 3000 for the bisphenol A type and from about 100 to 500 for the epoxy novolacs. Within this range there is a preferred range of epoxy equivalent weight of from about 350 to about 800 for the bisphenol A type and from about 125 to 350 for the epoxy novolacs. These two types of epoxy resins may be used alone or in admixtures in this invention.

The acid anhydrides which are to be used in carrying out the invention include the conventional mono- and poly-functional anhydrides. Typical of the mono-functional anhydrides are hexahydrophthalic anhydride, 1-methylhexahydrophthalic anhydride, tetrahydrophthalic anhydride, 1-methyltetrahydrophthalic anhydride, phthalic anhydride, NADIC anhydride, NADIC methylanhydride and the like. Polyfunctional anhydrides which may be employed include pyromellitic dianhydride, polyazelaic polyanhydride, the reaction product of trimellitic anhydride and a glycol, and benzophenone tetracarboxylic acid dianhydride. The anhydride may be used singly or in admixture. The total anhydride content of the epoxy-anhydride mixture must lie within the range of from about 0.5 to about 1.5 anhydride equivalents for each epoxy equivalent.

For a number of purposes the unmodified epoxide resins may be considered to have certain disadvantages. These disadvantages include high viscosity, high cost and too great a rigidity for specific applications. The resins are therefore modified by incorporation of diluents, flexibilizers and fillers. Diluents may be employed up to about 50 parts per 100 parts glycidyl ether resin in the epoxide formulation of this invention to reduce the viscosity of the mixed system. Reactive diluents such as diglycidyl ethers of 1,4-butylene or neopentyl glycol, phenyl glycidyl ether, butylglycidyl ether, alkyl glycidyl ether, vinyl cyclohexone dioxide, endo-dicyclopentadiene dioxide and octylene oxide can be used. Epoxidized natural oil extenders, such as epoxidized linseed or soy bean oils, octyl epoxy tallate and reactive plasticizers such as the conventional phthalates and phosphates may also be used in small amounts, up to about 40 parts per 100 parts glycidyl ether resin to provide increased flexibility. Thixotropic agents, such as $SiO_2$ in gel composition and pigments such as $TiO_2$ may be used as aids in fluidizing the composition or enhancing the color tones of the cured resins. Similarly, various fillers, such as silica, quartz, beryllium aluminum silicate, lithium aluminum silicate and mixtures thereof in average particle sizes from about 10 to 300 microns may be employed up to about 200 parts per 100 parts glycidyl ether resin to improve electrical properties of the resin formulation.

Electrical transformers, reactifiers and electronic components can be potted or cast within the completely reactive catalyzed epoxy resin compositions of this invention. Referring to FIG. 1 of the drawings, there is illustrated a potted transformer 10 which comprises a magnetic core 12 provided with one winding 14 which comprises an electrical conductor 16 which is insulated with insulation 18 and another winding 20 which comprises a conductor 22 also insulated with insulation 24. The magnetic core 12 with its associated windings 14 and 20 disposed about the core are completely potted in the epoxide resin 26 which has been catalyzed with the latent catalyst of this invention.

EXAMPLE 1

A resin formulation was made containing 70 grams of a liquid diglycidyl ether of bisphenol A resin, having an epoxy equivalent weight of 172–176 and a viscosity at 25° C. of 4000–5500 cp. (sold commercially by Dow Chemical Co. under the trade name DER-332), 30 grams of diglycidyl ether of neopentyl glycol diluent having a viscosity of 25° C. of 6–8 cp., 100 grams of 1-methyltetrahydrophthalic anhydride hardener and 0.02 gram of tetrabutylphosphonium acetate as latent catalyst (to provide a glycidyl ether bisphenol A epoxy resin:acid anhydride: quaternary organic phosphonium salt weight ratio of 100:140:0.03).

The components were poured into a container, stirred at room temperature and then put in a paint mixer for about five minutes. Ten gram samples were then poured into flat 2″ diameter aluminum dishes. These samples were placed in a 150° C. oven and inspected every 20 to 30 minutes to record the gel time of the samples. The approximate gel time was considered to be the amount of time it took the formulation to start to solidify.

Storage properties of the formulation were found by measuring viscosities at 25° C. in Gardner-Holdt bubble tubes. Measurements were usually taken at one-week intervals. The termination of the catalyzed life-time (pot-life) of these formulations was considered to be when the viscosity reached a value of 1000 cp. at 25° C.

To evaluate the effect of phosphonium accelerators on the electrical properties of the cured resin, ⅛″ thick castings were cured in an oven using a heating cycle of 16 hours at 135° C. plus 4 hours at 150° C., and 60 Hz. power factors (100×tan δ) were obtained at 125° C. (ASTM designation D150–65T). The results of these tests are recorded in Table 1.

EXAMPLE 2

A resin formulation was made using the same ingredients as Example 1 except that a large amount of latent catalyst, 2.0 grams of tetrabutylphosphonium acetate was used (to provide a glycidyl ether bisphenol A epoxy resin: acid anhydride:quaternary organic phosphonium salt weight ratio of 100:140:2.8). The ingredients were reacted and tests run as in Example 1.

EXAMPLE 3

A resin formulation was made using the same ingredients as Example 1 except that a different latent catalyst, 0.02 gram of methyltrioctylphosphonium dimethyl phosphate was used (to provide a glycidyl ether bisphenol A epoxy resin:acid anhydride quaternary organic phosphonium salt weight ratio of 100:140:0.03). The ingredients were reacted and tests run as in Example 1.

EXAMPLE 4

A resin formulation was made using the same ingredients as Example 3 except a larger amount of latent catalyst, 0.2 gram of methyltrioctylphosphonium dimethyl phosphate was used (to provide a glycidyl ether bisphenol A epoxy resin:acid anhydride:quaternary organic phosphonium salt weight ratio of 100:140:0.28). The ingredients were reacted and tests run as in Example 1.

EXAMPLE 5

A resin formulation was made using the same ingredients as Example 1 except that a different latent catalyst, 0.02 gram of methyltributylphosphonium dimethyl phosphate was used (to provide a glycidyl ether bisphenol A epoxy resin:acid anhydride:quaternary organic phosphonium salt ratio of 100:140:0.03). The ingredients were reacted and tests run as in Example 1.

EXAMPLE 6

A resin formulation, without anhydried was made, containing 0 grams of a liquid diglycidyl ether of bisphenol A resin, having an epoxy equivalent weight of 182–189 and a viscosity at 25° C. of 7000–10,000 cp. (sold commercially by Ciba Products Co. under the trade name aAraldite 6005), 30 grams of diglycidyl ether of 1,4-butylene glycol diluent having a viscosity at 25° C. of 15 cp. and 2.0 grams of tetrabutylphosphonium acetate (to provide a glycidyl ether bisphenol A epoxy resin:acid anhydride:quaternary organic phosphonium salt weight ratio of 100:0:2.8). The ingredients were reacted and tests run as in Example 1.

EXAMPLE 7

A resin formulation was made as a control sample, withut phosphonium salt, containing 70 grams of a liquid diglycidyl ether of bisphenol A resin having an epoxy equivalent weight of 172–176 and a viscosity of 25° C. of 4000–5500 cp. (sold commercially by Dow Chemical Co. under the trade name DER–332), 30 grams of diglycidyl ether of neopentyl glycol diluent having a viscosity at 25° C. of 7 cp., and 100 grams of 1-methyltetrahydrophthalic anhydride hardener (to provide a glycidyl ether bisphenol A epoxy resin:acid anhydride:quaternary organic phosphonium salt weight ratio of 100:140:0). The ingredients were reacted and tests run as in Example 1.

EXAMPLE 8

A resin formulation was made containing 75 grams of a solid epoxy-novolac resin, having an epoxy equivalent weight of 180 and a melting point of 28° C. (sold commercially by Celanese Resins as Epi-Rez 5155), 25 grams of a liquid diglycidyl ether of disphenol A resin having an epoxy equivalent weight of 190 and a viscosity of 12,000 cp. at 77° F. (sold commercially by Celanese Resins as Epi-Rez 510), 88 grams of NADIC methyl anhydride hardener and 0.18 gram of tetrabutylphosphonium acetate latent catalyst (to provide a glycidyl ether bisphenol A-novolac epoxy resin:acid anhydride:quaternary organic phosphonium salt weight ratio of 100: 88:0.18). No diluent was needed in this composition. The ingredients were reacted and tests run as in Example 1.

The results of the tests for gel time, pot life and power factor, for example 1 to 8 are shown below in Table 1.

TABLE 1

| Sample | Weight ratio (glycidyl ether epoxy resin:acid anhydride:phosphonium salt) | Gel time at 150° C. (minutes) | Pot life at 25° C. (days) | Power factor at 125° C. (100× tan δ) |
|---|---|---|---|---|
| Example 1 | (100:140:0.03) | 60 | 100+ | 10.0 |
| Example 2 | (100:140:2.8) | 5– | 7 | |
| Example 3 | (100:140:0.03) | 220 | 100+ | 11.7 |
| Example 4 | (100:140:0.28) | 15– | 30 | |
| Example 5 | (100:140:0.03) | 80 | 100+ | 5.9 |
| Example 6 | (100:0.2.8) | 1,500+ | | |
| Example 7 | (100:140:0) | 1,000+ | 200+ | 4.6 |
| Example 8 | (100:88:0.18) | 25 | 21 | |

These results show that every one of the phosphonium compounds display high catalytic behaviour, even at concentrations as low as about 0.03 part per 100 parts resin as shown in Examples 1, 3 and 5 (gel times of 60–220 minutes for 0.03 part phosphonium compound). This is emphasized by the fact that in the absence of phosphonium compound, the formulation shows very sluggish curing properties, as in Example 7 (gel time of over 1000 minutes).

A comparison of the storage data reveals that the phosphonium compounds provide suitable pot life values of about 20–100 days, as shown in FIG. 2, at concentrations up to about 0.7 part per 100 parts glycidyl ether epoxy resin, i.e., in a weight ratio range glycidyl ether of bisphenol A or novolac epoxy resin:acid anhydride:quaternary organic phosphonium salt of 90 to 120:130 to 165:0.02 to 0.70. Example 6 shows that anhydride is essential to provide reasonable gel and pot life times.

The effect of the phosphonium salts on the electrical properties of the cured resin system indicate that acceptably low power factors are present at 125° C. The power factors of 6 to 12% for these cured resins are substantially lower than those found for epoxy resins cured by a boron trifluoride-monethylamine complex, where values of about 150% are usually found in the same temperature range and where values of about 600 are not unusual.

These results indicate that quaternary organic phosphonium salts, when added to a glycidyl ether epoxy-anhydride system, within a critical weight ratio range, act as almost perfect latent accelerators, providing rapid gel times and good electrical properties and pot lives, making them suitable in resinous casting compositions used in encapsulating or insulation electronic members such as electrical conductors and coils and devices, such as transformers.

I claim:
1. A cured resinous composition suitable for insulating electrical members comprising by weight the reaction product of:
   (A) about 90 to 120 parts of a glycidyl ether epoxy resin selected from the group consisting of bisphenol A epoxy resins, novolac epoxy resins and mixtures thereof,
   (B) about 130 to 165 parts of an acid anhydride, and
   (C) about 0.02 to 0.70 part of a quaternary organic phosphonium salt acting as a latent catalyst and having the structural formula:

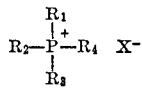

where $R_1$, $R_2$, $R_3$ and $R_4$ are selected from the group consisting of alkyl and aryl radicals and X is selected from the group consisting of propionate, acetate, butyrate, isobutyrate and dimethyl phosphate radicals.

2. The composition of claim 1, wherein the composition contains about 0.03 to 0.10 part quaternary organic phosphonium salt.

3. The composition of claim 1 also containing up to about 50 parts diluent and up to about 200 parts filler particles, of average particle sizes from about 10 to 300 microns, for 100 parts (A).

4. The composition of claim 1 wherein the quaternary phosphonium salts are selected from the group consisting of tetrabutylphosphonium acetate, methyltrioctylphosphonium dimethyl phosphate, methylphenylphosphonium dimethyl phosphate and methyltributylphosphonium dimethyl phosphate, and mixtures thereof, the bisphenol A epoxy resin has an epoxy equivalent weight of from about 300 to 3000, the novolac epoxy resin has an epoxy equivalent weight of from about 100 to 500 and the acid anhydride is selected from the group consisting of hexahydrophthalic anhydride, 1-methyl hexahydrophthalic anhydride, tetrahydrophthalic anhydride, 1-methyltetrahydrophthalic anhydride, phthalic anhydride, NADIC anhydride, NADIC methyl anhydride, pyromellitic dianhydride, polyazelaic polyanhydride, benzophenone tetracarboxylic acid dianhydride and mixtures thereof.

References Cited
UNITED STATES PATENTS

| | | | |
|---|---|---|---|
| 3,547,885 | 12/1970 | Dante et al. | 260—47 |
| 3,377,406 | 4/1968 | Newey et al. | 260—837 |
| 3,412,046 | 11/1968 | Payne | 260—2 |

WILLIAM H. SHORT, Primary Examiner

T. E. PERTILLA, Assistant Examiner

References Cited
UNITED STATES PATENTS

117—127, 232; 260—18 PF, 30.4 EP, 30.6 R, 37 EP, 47 EA. 59